(12) United States Patent
Youngs et al.

(10) Patent No.: US 8,163,439 B2
(45) Date of Patent: Apr. 24, 2012

(54) ELECTROLYTE MEMBRANES AND METHODS OF USE

(75) Inventors: Wiley J. Youngs, Akron, OH (US);
Matthew J. Panzner, Akron, OH (US);
Claire A. Tessier, Akron, OH (US)

(73) Assignee: The University of Akron, Akron, OH (US)

( * ) Notice: Subject to any disclaimer, the term of this patent is extended or adjusted under 35 U.S.C. 154(b) by 401 days.

(21) Appl. No.: 12/477,198

(22) Filed: Jun. 3, 2009

(65) Prior Publication Data

US 2009/0297915 A1 Dec. 3, 2009

Related U.S. Application Data

(60) Provisional application No. 61/058,314, filed on Jun. 3, 2008.

(51) Int. Cl.
*H01M 8/10* (2006.01)
*C08G 79/02* (2006.01)

(52) U.S. Cl. ......... 429/493; 429/491; 429/492; 528/399

(58) Field of Classification Search .................. 429/479, 429/491, 492, 493; 528/399, 391
See application file for complete search history.

(56) References Cited

U.S. PATENT DOCUMENTS

| | | | |
|---|---|---|---|
| 4,242,495 A * | 12/1980 | Hergenrother et al. | 528/168 |
| 4,258,170 A * | 3/1981 | Hergenrother et al. | 528/168 |
| 2006/0142542 A1 * | 6/2006 | Okada et al. | 528/399 |
| 2007/0265426 A1 | 11/2007 | Allcock et al. | |
| 2008/0075999 A1 * | 3/2008 | Izuhara et al. | 429/33 |

FOREIGN PATENT DOCUMENTS

| | | |
|---|---|---|
| WO | 03102050 | 12/2003 |
| WO | 2004072141 | 8/2004 |

OTHER PUBLICATIONS

D. Kumar and A. D. Gupta. Aromatic Cyclolinear Phosphazene Polyimides Based on a NovelBis-Spiro-Substituted Cyclotriphosphazene Diamine, Macromol. 1995, 28, 6323-6329.*
D.A. Masten and A.D. Bosco, "System Design for Vehicle Applications: GM/Opel," Introduction, Handbook of Fuel Cells—Fundamentals,Technology and Applications, vol. 4, Part 2, 2003, 12 pages, John Wiley & Sons, Ltd.
D. J. Jones and J.; Roziere, "Recent advances in the functionalisation of polybenzimidazole and polyetherketone for fuel cell applications", Journal of Membrane Science, 185, 2001, pp. 41-58.
K. D. Kreuer, "On Solids with Liquidlike Properties and the Challenge to Develop New Proton-Conducting Separator Materials for Intermediate-Temperature Fuel Cells", Chem. Phys. Chem., 3, 2002, pp. 771-775.
M. Schuster et al., "Proton mobility in oligomer-bound proton solvents: imidazole immobilization via flexible spacers", Solid State Ionics, 145, 2001, pp. 85-92.
H. G. Herz et al., "New fully polymeric proton solvents with high proton mobility" Electrochimca Acta 2003, 48, 2003, pp. 2165-2171.

* cited by examiner

*Primary Examiner* — Jerry Lorengo
*Assistant Examiner* — Carlos Barcena
(74) *Attorney, Agent, or Firm* — Renner Kenner Greive Bobak Taylor & Weber

(57) ABSTRACT

N-heterocyclic functionalized polymers and methods of use in fuel cells. Phenoxy-substituted polyphosphazenes and phosphazene trimers functionalized with azoles can provide polymer electrolyte membranes with high thermal stability coupled with a large number of proton binding sites per monomer unit.

7 Claims, 7 Drawing Sheets

ELECTROLYTE MEMBRANES AND METHODS OF USE

The invention relates to electrolyte membranes and methods of use in fuel cells. More particularly, the invention relates to N-heterocyclic functionalized polymers and methods of use in fuel cells. Even more particularly, the invention relates azole-substituted N-heterocyclic functionalized polymers and methods of use in fuel cells.

BACKGROUND OF THE INVENTION

The recent increasing interest in the development of alternative fuel sources has lead to a number of new synthetic challenges. At the forefront of many research efforts is the advancement of hydrogen fuel cell technology. Fuel cells offer significant economical, environmental and operational benefits over conventional fuels. Fuel cells function by converting the chemical energy stored in molecular hydrogen directly to electrical energy.

Direct methanol and $H_2/O_2$ proton exchange membrane fuel cells are promising power generators for terrestrial and space applications where high energy efficiencies and high power densities are required. An important component of these devices is the proton conducting membrane. For a cation exchange membrane to be used in such fuel cells, a number of requirements are to be met, including high ionic (protonic) conductivity, dimensional stability (low/moderate swelling), low electro-osmotic water flow, mechanical strength and chemical stability over a wide temperature range, a high resistance to oxidation, reduction, and hydrolysis, and low hydrocarbon fuel cross-over rates (e.g., low methanol cross-over for direct methanol fuel cells). To date, those membranes reported in the open literature that conduct ions (protons) at moderate temperatures also possess high methanol permeability and those membranes that do not transport methanol have a low proton conductivity.

Perfluorosulfonic acid (PFSA)-based membranes (e.g., Nafion) have been found to possess most of the properties needed for good performance in fuel cells. In conventional near-ambient temperature fuel cells, the polymer electrolytes, such as Nafion, require hydration for suitable operation. The proton conductivity of the membrane is substantially reduced above 80° C. due to a loss of hydration of the membrane. The proton conductivity at elevated temperatures (>100° C.) of a conventional Nafion membrane can be improved by running the fuel cell under pressure, however the complexity of the system increases and the power density is reduced in the overall fuel cell system. These high temperature limitations are particularly problematic because fuel cells are known to have a higher performance at temperatures of 150° C. and above.

Prior art fuel cell membranes containing imidazoles, as seen in FIG. 1, are currently under investigation. The use of imidazoles in place of water in membranes produces proton conductivities between 150° C. and 250° C. that are comparable to that of hydrated polymers. For hydrated polymers to be useful at such temperatures, it is necessary to enclose the hydrated polymers in closed electrochemical cells in order to avoid the loss of water. Similarly heterocycles, such as imidazoles, may also escape from open fuel cells. Imidazoles that have been immobilized by being bound to oligomers, as seen in FIG. 2, have been shown to have proton conductivities of $5\times10^{-3}$ S cm$^{-1}$ at 120° C. in substantially water-free materials. Also under investigation is the immobilization of heterocycles on polymer supports, as seen in FIG. 3, that are capable of providing high mobility for proton conductivity. It has been reported that conductivities of the order of $10^{-3}$ S cm$^{-1}$ at 200° C. using polymer bound imidazoles and suggest this corresponds to a high mobility of protonic charge carries of $10^{-5}$ cm$^2$ s$^{-1}$. In these systems higher conductivity is directly correlated with the ratio of the imidazole groups to inert polymer support.

Notwithstanding the state of the art as described herein, there is a need for further improvements in preparing N-heterocyclic functionalized polymers, such as triazole functionalized phosphazene trimers or triazole functionalized polyphosphazenes, with greater ratios of proton conducting sites to polymer support and polymer supports that have high thermal stability are needed. Materials possessing these properties may provide an opportunity to develop more efficient non-hydrated polymer electrolyte membrane (PEM) fuel cells.

SUMMARY OF THE INVENTION

Polyphosphazenes are a group of flexible inorganic backbone polymers with alternating phosphorus and nitrogen single and double bonds. The phosphorus atoms may be functionalized in order to alter the properties of the polymer. Phenoxy-substituted polyphosphazenes are known to have high thermal and chemical stability. Phenoxy-substituted polyphosphazenes functionalized with azoles and triazole functionalized phosphazene trimers can provide PEMs with high thermal stability coupled with a large number of proton binding sites per monomer unit. They may also provide a PEM which excludes the need for hydration allowing for higher operating temperatures and higher fuel cell efficiency.

In general, one aspect of the invention is to provide a polymer electrolyte membrane for use in a fuel cell that includes a N-heterocyclic functionalized phosphazene polymer. The N-heterocyclic functionalized phosphazene polymer is represented by the formula:

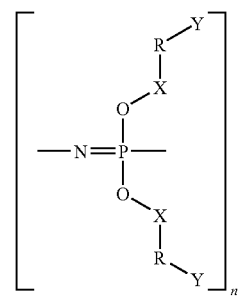

wherein X is an aryl or alkoxy linker group, R is a nitrogen containing heterocycle, Y is a functional group bonded to the nitrogen containing heterocycle to form a functionalized nitrogen containing heterocycle and n is 1 to 2000.

In another embodiment of the invention, a functionalized polyphosphazene derivative is provided. The functionalized polyphosphazene derivative includes at least one phosphazene compound, at least one linker group selected from the group consisting of an aryloxy compound and an alkoxy compound, and at least one nitrogen heterocycle, wherein the linker group links the at least one nitrogen heterocycle with the phosphorus atom of phosphazene.

In still yet another embodiment of the invention, a method of preparing a functionalized polyphosphazene includes the steps of reacting polyphosphazene with at least one nitrogen heterocycle to form a N-heterocyclic functionalized polyphosphazene.

In yet another embodiment of the invention, a method of preparing a random copolymer or a block copolymer includes the steps of reacting polyphosphazene with at least one nitrogen heterocycle to form a N-heterocyclic functionalized polyphosphazene and reacting sulfonic acid with the N-heterocyclic functionalized polyphosphazene, wherein each phosphorus atom of polyphosphazene is substituted with two identical nitrogen heterocycles, two different nitrogen heterocycles, or a nitrogen heterocycle and a sulfonic acid group.

Another embodiment of the invention includes a polymer electrolyte membrane for use in a fuel cell including a N-heterocyclic functionalized phosphazene phosphazene trimer.

DETAILED DESCRIPTION OF THE INVENTION

Figure 1:
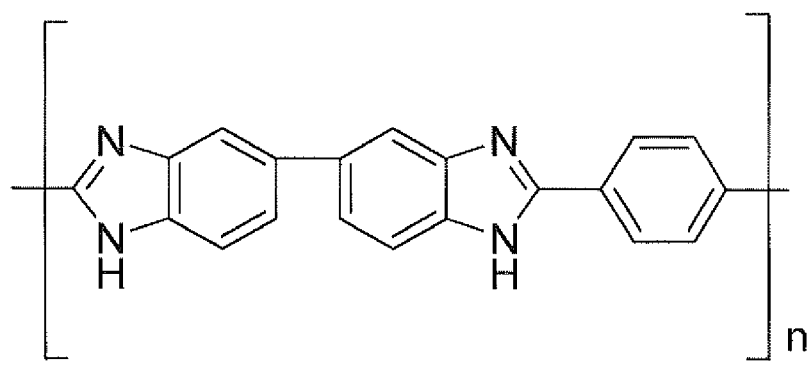
FIG. 1 is an example of representative imidazoles used in prior art fuel cell membranes.
Figure 2:
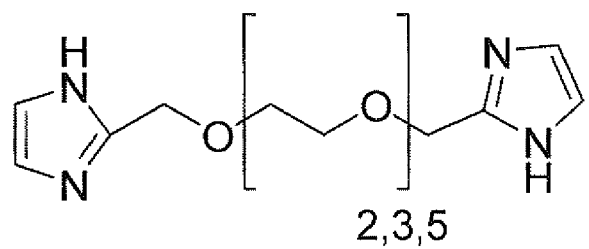
FIG. 2 is an example of imidazole-bound oligomers used in prior art fuel cell membranes.
Figure 3:
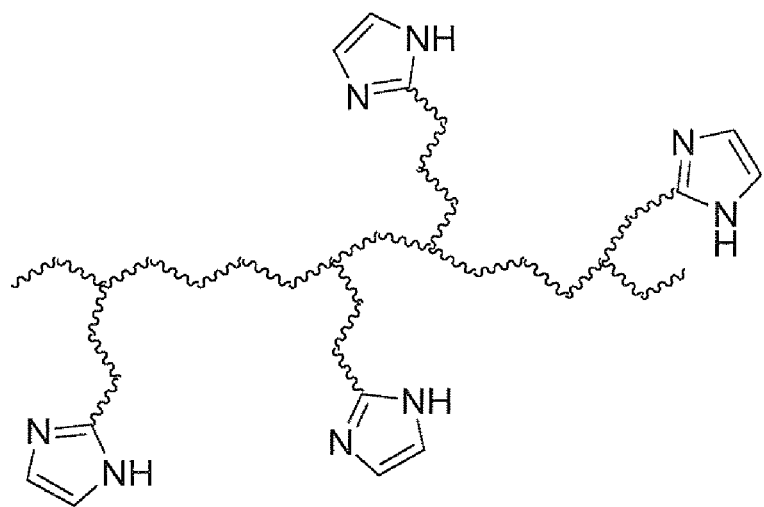
FIG. 3 shows the immobilization of heterocycles on polymer supports.
Figure 4:
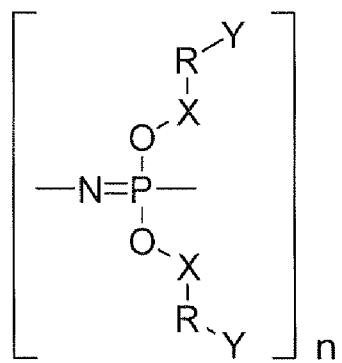
FIG. 4 is a generic chemical formula representing an embodiment of the invention.

One embodiment of the invention includes the synthesis of polyphosphazenes that are modified with pendant groups containing nitrogen heterocycles and their method of use for high temperature, non-hydrated PEM fuel cells. FIG. 4 details a generic chemical formula for these types of polymers. In one embodiment, the X-group represents a linker group which may be an aryl group or an alkoxy group. In another embodiment of the invention, the aryl group may be a phenyl, a fluorinated derivative thereof or an alkyl chain, such as but not limited to, a methyl or a fluorinated derivative thereof. In yet another embodiment of the invention, each of the R-groups may be defined as nitrogen containing heterocycles. Examples of such nitrogen containing heterocycles include, but are not limited to, imidazoles, triazoles, and tetrazoles. In still another embodiment of the invention, the nitrogen containing heterocycles may be functionalized with various chemical moieties designated Y at various positions such as, but not limited to, sulfonic acid groups. The R-groups may also be the same or different groups with differing functionalities along the length of the polymer chain. The n repeating unit of the polymer may be in the range from 1 to 2000.

Figure 5:
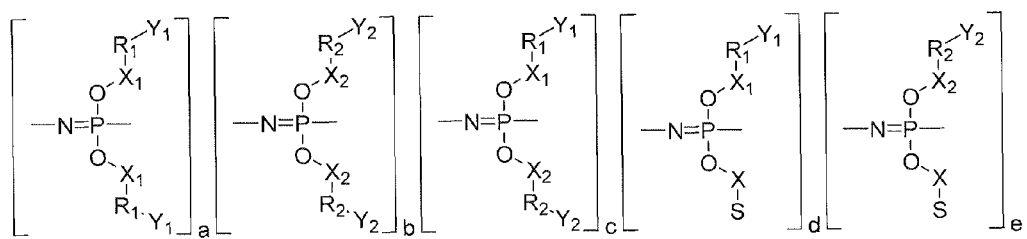
FIG. 5 is a general formula for random copolymers and block copolymers according to an embodiment of the invention.

In another embodiment of the invention, the polymer may be synthesized by varying substitutions of nitrogen heterocycles and sulfonic acid side groups along the length of the polymer chain. In one embodiment of the invention, each phosphorus atom of the polymer backbone may be substituted with two identical nitrogen heterocycles. In another embodiment of the invention, each phosphorus atom of the polymer backbone may be substituted with two different nitrogen heterocycles. In still yet another embodiment of the invention, each phosphorus atom of the polymer backbone may be substituted with a nitrogen heterocycle and a sulfonic acid group. These types of substitutions may result in either random copolymers or block copolymers. A general formula for these random copolymers and block copolymers are provided in FIG. 5. In this formula, a-e may be zero or a positive integer. In one embodiment of the invention, the S-group may represent a sulfonic acid group directly bound to the phosphorus atom of the polymer. In another embodiment of the invention, a linker X-group may be directly bound to the phosphorous atom of the polymer. In one embodiment of the invention, the linker X-group may be an aryl group such as, but not limited to, a phenyl or a fluorinated derivative thereof, or an alkoxy group. In another embodiment of the invention, the linker group may be an alkyl chain such as, but not limited to, a methyl derivative and a fluorinated derivative thereof. Attached to the X-group is an R-group which may be defined as nitrogen containing heterocycles. Examples of such nitrogen containing heterocycles include, but are not limited to, imidazoles, triazoles, and tetrazoles. The nitrogen containing heterocycles may be functionalized with various chemical moieties designated Y at various positions such as, but not limited to, sulfonic acid groups. The R-groups may also be the same or different groups with differing functionalities along the length of the polymer chain. These polymers have been found to be thermally stable with decomposition temperatures up to 250° C.

The following example illustrates the preparation of the N-heterocyclic functionalized polymers, in particular triazole functionalized polyphosphazenes, for use in PEM fuel cells. Unless otherwise indicated in the following examples and elsewhere in the specification and claims, all parts and percentages are by weight, and all temperatures are in degrees Celsius.

EXAMPLES

Synthesis of poly[bis(4-(1,2,4-triazol-1-yl)phenoxy)phosphazene]

Figure 6:
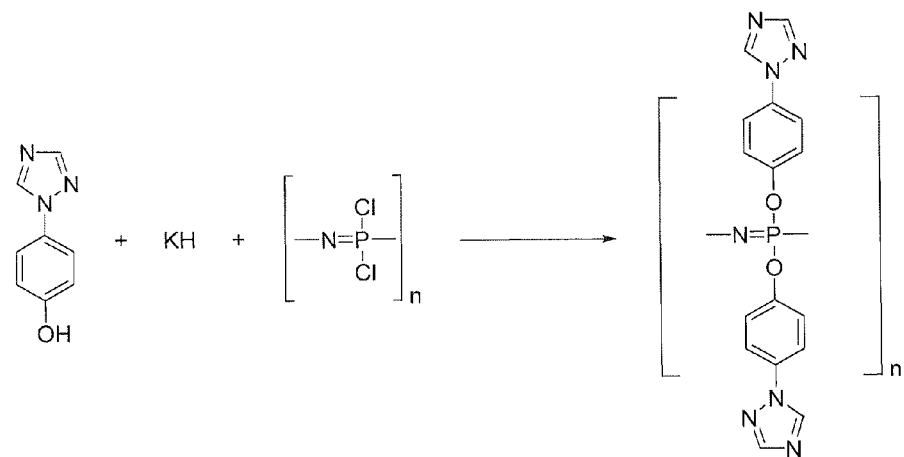
FIG. 6 is a general reaction showing the preparation of poly[bis(4-(1,2,4-triazol-1-yl)phenoxy)polyphosphazene]

The starting material, 4-(1,2,4-triazol-1-yl)phenol (1.66 g, 10.30 mmol) was added into a 150-mL Schlenk flask containing KH (0.41 g, 10.30 mmol) and dry THF (70 mL). The reaction mixture was stirred and heated to 50° C. under $N_2$ for 2 hours to give 4-(1,2,4-triazol-1 yl)phenoxide salt. The solution containing $(NPCl_2)_n$ (0.50 g, 1.36 mmol of repeating unit) and dry THF (30 mL) was transferred into the flask containing 4-(1,2,4-triazol-1 yl)phenoxide salt solution using a cannula transfer at room temperature. The mixture was stirred and refluxed under $N_2$ for at least for 120 hours. After filtration, the filtrate was evaporated to give brown powder. To remove salt, it was washed with deionized water. To further remove impurities including the starting material, it was then washed with hot dry THF and to yield poly[bis(4-(1,2,4-triazol-1-yl)phenoxy)polyphosphazene] (1.13 g, 3.09 mmol, 71%) as a dark brown powder. The general reaction for producing poly[bis(4-(1,2,4-triazol-1-yl)phenoxy)polyphosphazene] is shown in FIG. 6.

Synthesis of poly[bis(4-(1,2,4-triazol-1-yl)phenoxy)phosphazene]

The starting material, 4-(1,2,4-triazol-1-yl)phenol (1.66 g, 10.30 mmol) was added into a 150-mL Schlenk flask containing KH (0.41 g, 10.30 mmol) and dry THF (70 mL). The reaction mixture was stirred and heated to 50° C. under $N_2$ for 2 hours to give 4-(1,2,4-triazol-1 yl)phenoxide salt. The solution containing $(NPCl_2)_n$ (0.50 g, 1.36 mmol of repeating unit) and dry THF (30 mL) was transferred into the flask containing 4-(1,2,4-triazol-1 yl)phenoxide salt solution using a cannula transfer at room temperature. The mixture was stirred and refluxed under $N_2$ for at least for 120 hours. After filtration, the filtrate was evaporated to give brown powder. To remove salt, it was washed with deionized water. To further remove impurities including the starting material 1c, it was then washed with hot dry THF. The yield of the final product was 1.13 g, 3.09 mmol, 71% as a dark brown powder.

Another embodiment of the invention includes the synthesis of phosphazenes trimers that are modified with pendant groups containing nitrogen heterocycles and their method of use for high temperature, non-hydrated PEM fuel cells. These phosphazene trimers include N-heterocyclic functionalized phosphazene trimers. Examples of such nitrogen containing heterocycles include, but are not limited to, imidazoles, triazoles, and tetrazoles.

The following example illustrates the preparation of the N-heterocyclic functionalized polymers, in particular triazole functionalized polyphosphazene trimers, for use in PEM fuel cells. Unless otherwise indicated in the following examples and elsewhere in the specification and claims, all parts and percentages are by weight, and all temperatures are in degrees Celsius.

EXAMPLES

Synthesis of hexakis(4-cyanophenoxy)cyclotriphosphazene

In a 150-mL Schlenk flask, $(NPCl_2)_3$ (1.20 g, 3.45 mmol) was dissolved in 30 mL of dry THF. A solution of $CNC_6H_4O^-K^+$ was prepared by adding 4-cyanophenol (2.97 g, 24.93 mmol) to a 150-mL Schlenk flask containing KH (1.00 g, 24.93 mmol) and 70 mL of dry THF. The reaction mixture was heated to 50° C. for 2 hours. The solution of $(NPCl_2)_3$ was transferred into the flask containing $CNC_6H_4O^-K^+$ solution using a cannula at room temperature. The mixture was stirred and then refluxed for 72 hours. Filtration of the mixture yielded hexakis(4-cyanophenoxy)cyclotriphosphazene as a white precipitate. The white precipitate was washed with deionized water to remove salts and subsequently dried. Yield: 2.1897 g, 2.59 mmol, 75%. Mp: >230° C.

Synthesis of hexakis(4-tetrazolylphenoxy)cyclotriphosphazene

In a 100-mL Schlenk flask, (4-cyanophenoxy)cyclotriphosphazene was dissolved in DMF (10 mL) and $NaN_3$ (0.51 g, 7.84 mmol) and $NH_4Cl$ (0.38 g, 7.10 mmol) were added under $N_2$. The mixture was heated at 120° C. for 48 hours. After cooling, the reaction mixture was acidified with 3N HCl. A white solid precipitate was filtered and then washed with deionized water and dried to give hexakis(4-tetrazolylphenoxy)cyclotriphosphazene (0.8331 g, 0.75 mmol, 64%). Mp: >230° C.

Synthesis of hexakis[4-(1,2,4-triazol-1-yl)phenoxy] cyclotriphosphazene

The starting material 4-(1,2,4-triazol-1-yl)phenol (1.50 g, 9.30 mmol) was added into a 150-mL Schlenk flask contain- ing KH (0.36 g, 9.30 mmol) and dry THF (70 mL). The reaction mixture was stirred and heated to 50° C. under $N_2$ for 2 hours to give potassium 4-(1,2,4-triazol-1 yl)phenoxide salt. A solution containing $(NPCl_2)_3$ (0.45 g, 1.29 mmol) in dry THF (30 mL) was transferred into the flask containing the potassium 4-(1,2,4-triazol-1 yl)phenoxide salt solution using a cannula at room temperature. The mixture was stirred and refluxed under $N_2$ for 72 hours. After filtration, the filtrate was evaporated to give an orange solid which was washed with deionized water. To further remove impurities including the starting material 1c, the material was washed with methanol and dried to give hexakis[4-(1,2,4-triazol-1-yl)phenoxy]cyclotriphosphazene (1.14 g, 1.04 mmol, 74%) as a light brown powder. Mp: 229° C.

Synthesis of hexakis[4-(imidazol-1-yl)phenoxy]cyclotriphosphazene

A mixture of 4-(imidazol-1-yl)phenol (Id) (1.00 g, 6.24 mmol), KH (0.25 g, 6.24 mmol) and dry THF (50 mL) was stirred and heated to 50° C. under $N_2$ for 2 hours to give potassium 4-(imidazol-1-yl)phenoxide salt. A solution of $(NPCl_2)_3$ (0.30 g, 8.67 mmol) in dry THF (20 mL) was transferred by cannula into the flask containing potassium 4-(imidazol-1-yl)phenoxide salt. The mixture was then stirred and refluxed under $N_2$ for 72 hours. A brown precipitate was collected by filtration. The brown precipitate was washed with water to remove salts and dried to give the final product of hexakis[4-(imidazol-1-yl)phenoxy]cyclotriphosphazene (0.64 g, 0.59 mmol, 67%). Mp: 225° C.

Synthesis of poly[bis(4-cyanophenoxy)phosphazene]

A solution of $CNC_6H_4O^-K^+$ was prepared by adding 1a (1.23 g, 10.32 mmol) to a 150-mL Schlenk flask containing KH (0.415 g, 10.32 mmol) and dry THF (50 mL). The reaction mixture was heated to 50° C. for 2 hours. The solution containing $(NPCl_2)_n$ (0.5 g, 1.77 mmol of repeating unit) and dry THF (30 mL) was transferred into the 150-mL Schlenk flask containing $CNC_6H_4O^-K^+$ solution using a cannular technique at room temperature. The mixture was stirred under $N_2$ and then refluxed for at least for 120 hours. Evaporation of the reaction mixture gave a white solid. The white solid was then washed with THF again to remove all starting materials. To remove salts, the white solid was washed with deionized water and dried to give poly[bis(4-cyanophenoxy)phosphazene] as white powder. Yield: 0.7308 g, 2.60 mmol, 60%).

Synthesis of poly[bis(4-(1,2,4-triazol-1-yl)phenoxy) phosphazene]

The starting material 4-(1,2,4-triazol-1-yl)phenol (1.66 g, 10.30 mmol) was added into a 150-mL Schlenk flask containing KH (0.41 g, 10.30 mmol) and dry THF (70 mL). The reaction mixture was stirred and heated to 50° C. under $N_2$ for 2 hours to give 4-(1,2,4-triazol-1 yl)phenoxide salt. The solution containing $(NPCl_2)_n$ (0.50 g, 1.36 mmol of repeating unit) and dry THF (30 mL) was transferred into the flask containing 4-(1,2,4-triazol-1 yl)phenoxide salt solution using a cannula transfer at room temperature. The mixture was stirred and refluxed under $N_2$ for at least for 120 hours. After filtration, the filtrate was evaporated to give brown powder. To remove salt, it was washed with deionized water. To further remove impurities including the starting material 1c, it was then washed with hot dry THF and to yield poly[bis(4-(1,2,4-triazol-1-yl)phenoxy)polyphosphazene] (1.13 g, 3.09 mmol, 71%) as a dark brown powder.

Synthesis of hexakis(4-(1H-5-methyltetrazol-1-ylmethyl)phenoxy)cyclo triphosphazene 4-(1H-5-methyltetrazol-1-ylmethyl)phenol 10 mmol of azole derivative was heated together with 10 mmol of 4-hydroxybenzyl alcohol at 155° C. for 30 minutes. Upon cooling the product was well crushed and washed with cold ethanol to remove unreacted starting materials. NaH (0.2254 g) was dissolved in 25 ml of dry THF and 4-(1H-5-methyltetrazol-1-ylmethyl)phenol (1.000 g) in 30 ml of THF was added. 0.2286 g of $(NPCl_2)_3$ dissolved in THF was also added. The reaction mixture was then refluxed for 3.5 days. Upon cooling, and the reaction mixture was filtered and the solvent removed to afford a white colored product hexakis(4-(1H-5-methyltetrazol-1-ylmethyl)phenoxy)cyclo triphosphazene 4-(1H-5-methyltetrazol-1-ylmethyl)phenol.

Synthesis of $[N_3P_3(p\text{-}O\text{—}C_6H_4\text{—}CH_2C_3N_2Cl_2)_6]$

NaH (0.08 g) was dissolved in 25 ml of dry THF and in to it 4,5-dichloroimidazolylphenol (0.5 g) in 30 ml of THF was added. 0.0897 g of $(NPCl_2)_3$ dissolved in THF was also added. The reaction mixture was then refluxed for 3.5 days. Upon cooling, it was filtered and the solvent removed to give a red colored product, $N_3P_3(p\text{-}O\text{—}C_6H_4\text{—}CH_2C_3N_2Cl_2)_6$.

Synthesis of $[N_3P_3(p\text{-}O\text{—}C_6H_4\text{—}CHO)_6]$

NaH (0.459 g), $Me_4N^+Br^-$ (0.004 g) and $(NPCl_2)_3$ (0.5 g) were combined in a 3-neck flask in that 50 ml of THF. 4-hydroxybenzaldehyde dissolved in 12.5 ml of dry THF was then added. After 30 minutes, 1 ml of triethylamine was added in to the reaction mixture. The reaction was stirred at room temperature for additional 20 hours. After filtration, the filtrate was washed with THF (15 ml). The volatiles were removed and 7.5 ml of water were added. The white solid formed by the addition of water was stirred for one more hour. The solid was filtered off and washed with 15 ml diethyl ether.

Synthesis of $[N_3P_3(p\text{-}O\text{—}C_6H_4\text{—}CH_2OH)_6]$ $N_3P_3(p\text{-}O\text{—}C_6H_4\text{—}CHO)_6$ (0.49 g) was dissolved in 120 ml THF/MeOH (1:1) mixture and $NaBH_4$ (0.147 g) was added and stirred for 20 hours at room temperature. The mixture was reduced to a small volume under reduced pressure. The white precipitate was treated with a small amount of water and stirred for one more hour. Upon filtration the product, $N_3P_3(p\text{-}O\text{—}C_6H_4\text{—}CH_2OH)_6$, was washed with $H_2O$ and then with diethyl ether.

Synthesis of $[N_3P_3(p\text{-}O\text{—}C_6H_4\text{—}CH_2Br)_6]$ 1.75 ml of 48% HBr and 0.5 ml of conc. $H_2SO_4$ were mixed together. The acid mixture was added to 0.5 g of $N_3P_3(p\text{-}O\text{—}C_6H_4\text{—}CH_2OH)_6$. The mixture was refluxed at 100° C. for 5 hours. After the filtration the precipitate was washed with a large amount of water to obtain the product $N_3P_3(p\text{-}O\text{—}C_6H_4\text{—}CH_2Br)_6$.

Films for use as polymer electrolyte membrane materials may be prepared by imbedding the phenoxy-substituted polyphosphazenes functionalized with azoles and triazole functionalized phosphazene trimers along with either phenylphosphonic acid or phosphoric acid into a polyamide matrix. In one embodiment, a planetary centrifugal mixer may be employed to combine liquid polyamic acid and a triazole functionalized phosphazene trimer or polyphosphazene and acid into solution suitable for film casting. Following casting, the material may be heated to produce the phosphazene imbedded polyimide film.

In one embodiment, the polymer films are prepared through solution processing followed by melt processing. The solution is prepared filling a container that includes a solid media, which includes the polymer selected additives, mixed with a compatible organic solvent. The container containing the solution is then placed in a planetary centrifugal mixer which rotates the container about its symmetry axis while applying high gravitational forces on the container by applying rotation similar to an ultracentrifuge. An ultrasound assisted mixing device may also be used to assist in the deagglomeration of particles if they are present.

After the polymer solution is prepared, it is then ready for casting. The casting of solutions is carried out using a commercial size casting apparatus. In one embodiment, the casting apparatus is about 33 ft long and solution is cast onto a carrier of choice using double doctor blade casting systems. The casting systems may include 3, 6, 12, 24" wide double doctor blade systems that facilitate the preparation of polymer films from narrow samples to very wide samples. This equipment is also equipped with an automatic solution delivery system, for example a 6 gallon capacity, to produce large quantities of films continuously. The solution is cast onto the carrier and transported into the heating chamber consisting of 4 separately controlled underbed heaters by a steel roll to roll device. In addition, the air above the film being carried may be simultaneously heated by HEPA filtered preheated air from above. This facilitates controlled evaporation of the solvent to solidify the films at the end of the machine.

The films produced include 60% by wt. polyimide and 40% secondary components with 6:1 doped phenylphosphonic acid to triazole functionalized phosphazene, 10:1 doped phenylphosphonic acid to triazole functionalized phosphazene, 6:1 doped phosphonic acid to triazole functionalized phosphazene and phosphonic acid doped triazole functionalized polyphosphazene. In one embodiment, the films may range from 40 to 80 microns in thickness.

Figure 7:
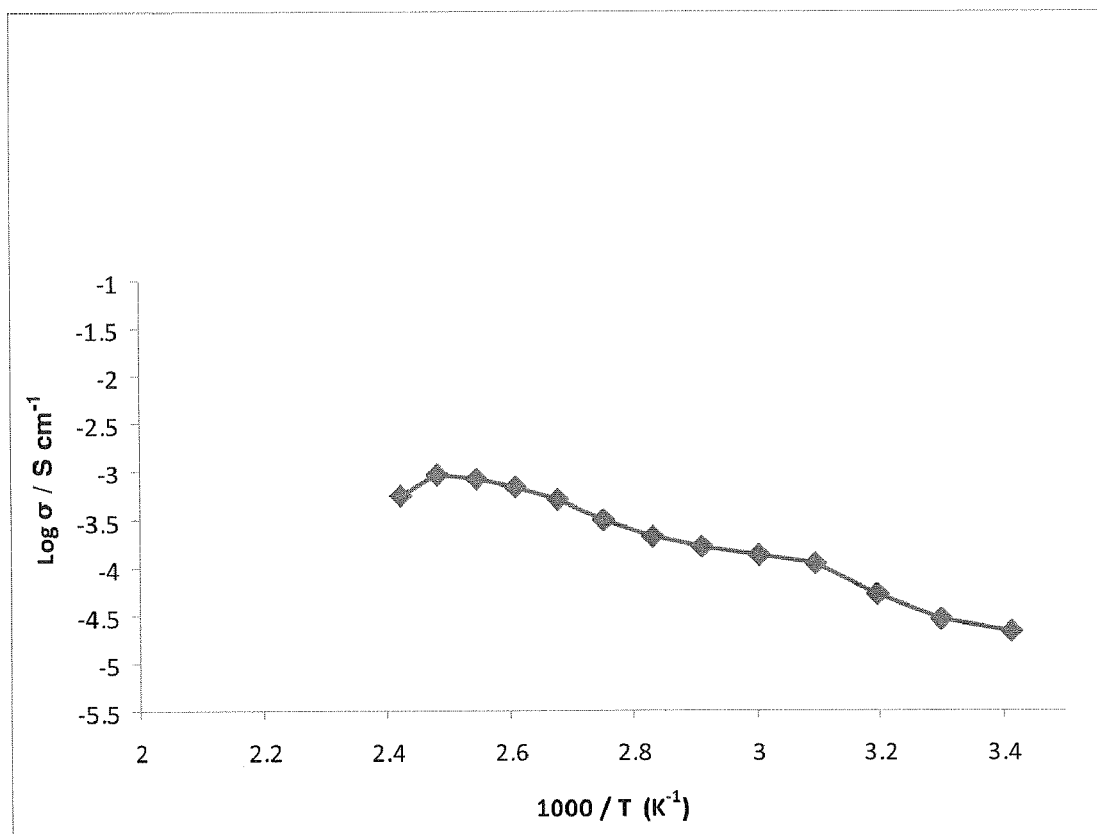
FIG. 7 is a graph measuring the conductivity measurements of a first triazole substituted phosphazene trimer, phenylphosphonic acid doped polyimide.
Figure 8:
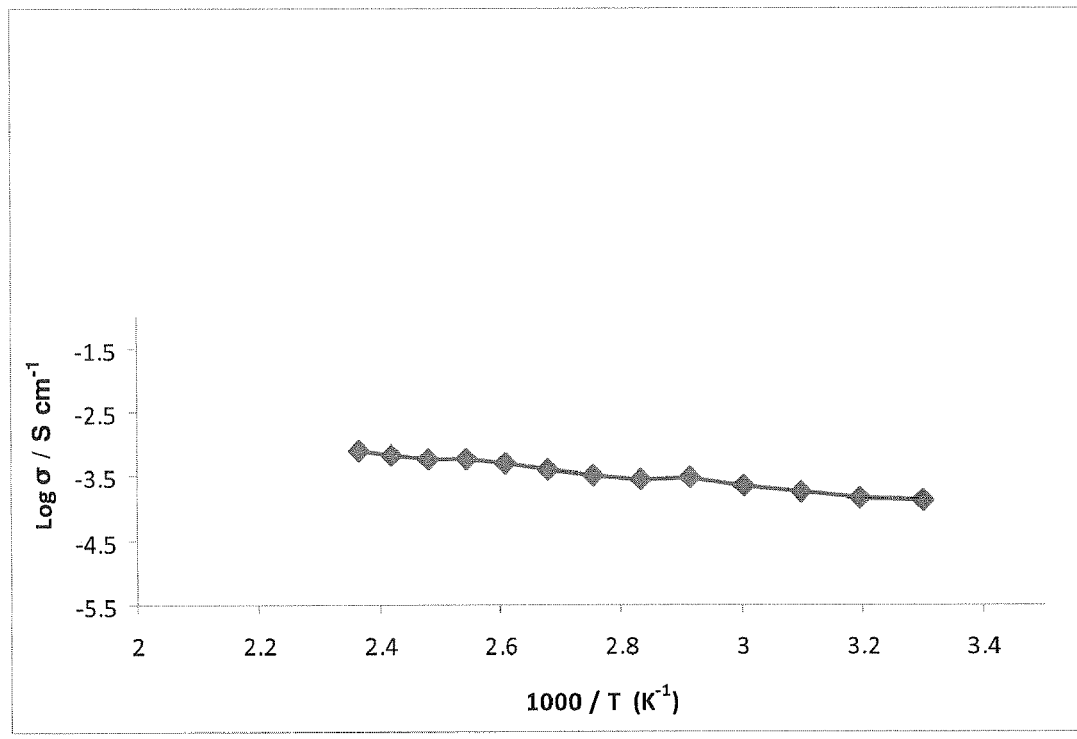
FIG. 8 is a graph measuring the conductivity measurements of a second triazole substituted phosphazene trimer, phenylphosphonic acid doped polyimide.
Figure 9:
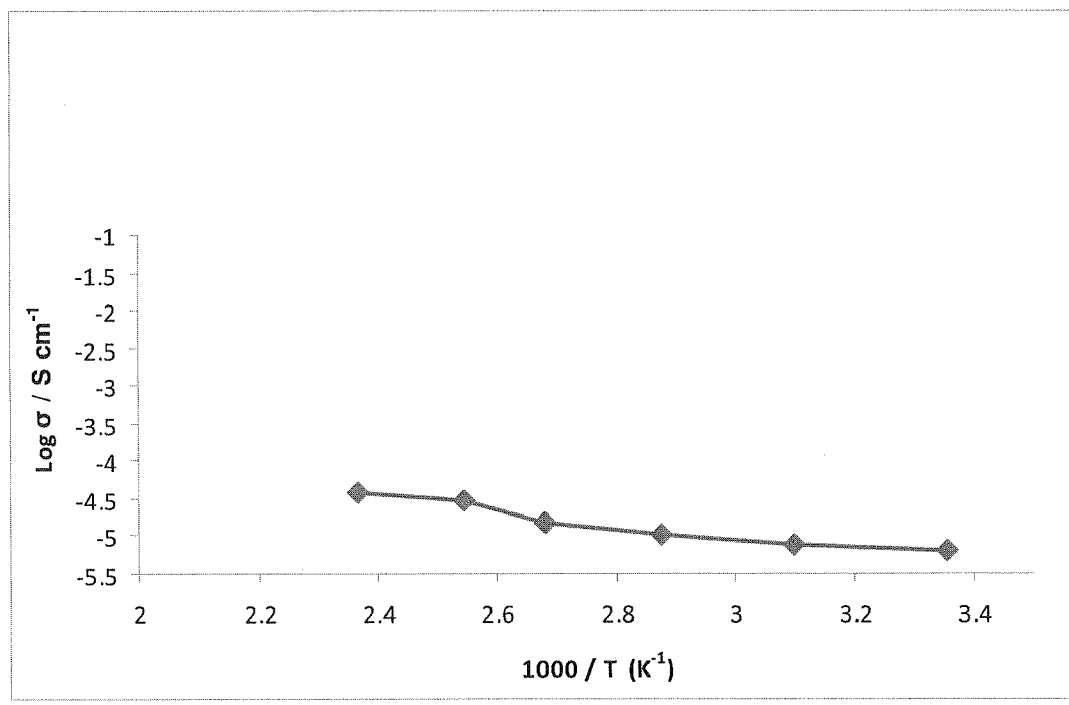
FIG. 9 is a graph measuring the conductivity measurements of a first polyimide and triazole trimer with phosphoric acid.
Figure 10:
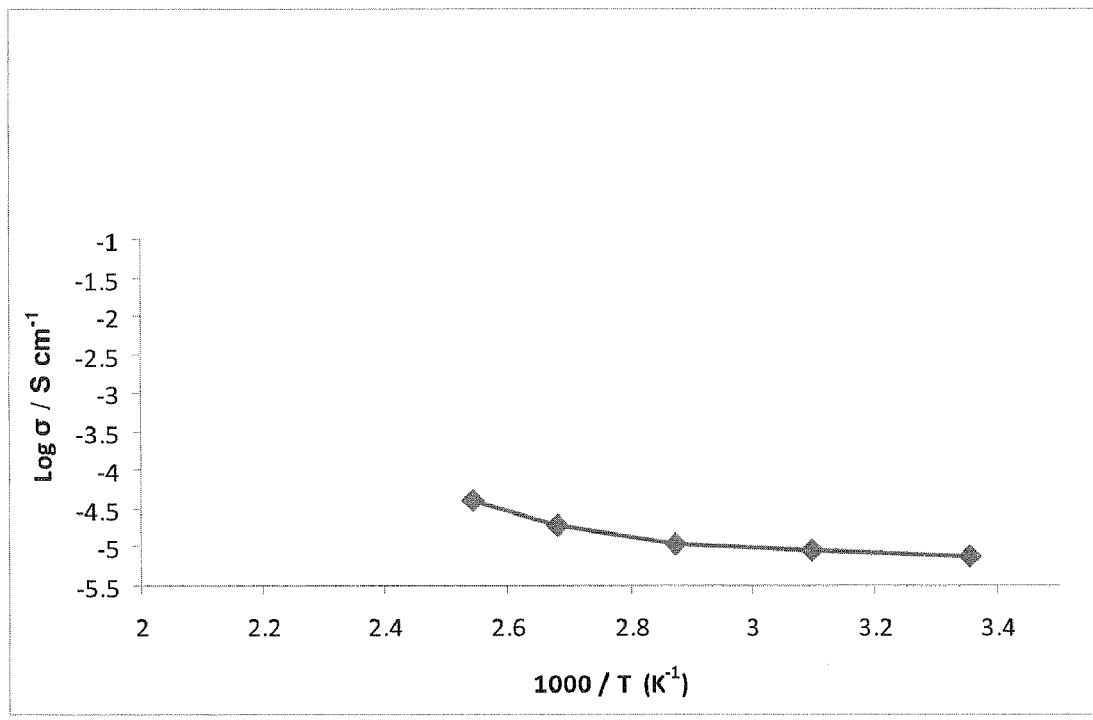
FIG. 10 is a graph measuring the conductivity measurements of a second polyimide and triazole trimer with phosphoric acid.

Conductivity measurements were performed on phosphazene polymer electrolyte films produced by the methods described herein. As seen in FIG. 7, conductivity measurements were conducted on a triazole substituted phosphazene trimer, phenylphosphonic acid doped polyimide containing 60% by weight polyimide, 40% by weight of a secondary component (6:1 polyphosphazene:triazole trimer) as a function of temperature and dry hydrogen gas at both the anode and cathode. As seen in FIG. 8, conductivity measurements were conducted on a triazole substituted phosphazene trimer, phenylphosphonic acid doped polyimide containing 60% by weight polyimide, 40% by weight of a secondary component (10:1 polyphosphazene:triazole trimer) as a function of temperature and dry hydrogen gas at both the anode and cathode. As seen in FIG. 9, conductivity measurements were conducted on a 60% polyimide, 40% triazole trimer with phosphoric acid doped with one phosphoric acid per triazole as a function of temperature and dry hydrogen gas at both the anode and cathode. As seen in FIG. 10, conductivity measurements were conducted on a 60-70% by weight polyimide, 30-40% by weight triazole functionalized polyphosphazene doped with one phosphoric acid per triazole as a function of temperature and dry hydrogen gas at both the anode and cathode.

The invention has been described with respect to several embodiments. This description is not intended as a limitation; other modifications or variations in the specific form shown and described will be apparent to those skilled in the art and will fall within the spirit of the invention and the scope of the following claims.

What is claimed is:

1. A polymer electrolyte membrane for use in a fuel cell comprising:
    a N-heterocyclic functionalized phosphazene polymer embedded in a polyimide matrix.

2. The polymer electrolyte membrane of claim 1, wherein the N-heterocyclic functionalized phosphazene polymer is a trimer.

3. A polymer electrolyte membrane for use in a fuel cell, the membrane comprising an N-heterocyclic functionalized phosphazene polymer represented by the formula:

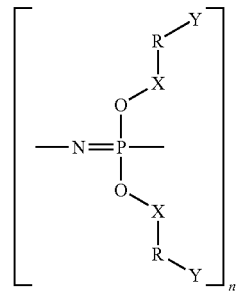

wherein X is an aryl or alkoxy linker group, R is a nitrogen containing heterocycle, Y is a functional group bonded to the nitrogen containing heterocycle to form a functionalized nitrogen containing heterocycle and n is 1 to 2000.

4. The polymer electrolyte membrane of claim 3, wherein R is selected from the group consisting of an imidazole, a triazole, and a tetrazole.

5. The polymer electrolyte membrane of claim 3, wherein Y is selected from the group consisting of sulfonic acid, an alkyl group and a halogen group.

6. The polymer electrolyte membrane of claim 3, wherein the polymer includes a plurality of compositionally identical functionalized nitrogen containing heterocycles.

7. The polymer electrolyte membrane of claim 3, wherein the polymer includes a plurality of compositionally different functionalized nitrogen containing heterocycles.

* * * * *